United States Patent
Min et al.

(10) Patent No.: US 11,115,588 B1
(45) Date of Patent: Sep. 7, 2021

(54) CONTROL CIRCUIT AND CAMERA IRIS DRIVING DEVICE

(71) Applicant: Samsung Electro-Mechanics Co., Ltd., Suwon-si (KR)

(72) Inventors: Sang Hyun Min, Suwon-si (KR); Kwang Mook Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/025,180

(22) Filed: Sep. 18, 2020

(30) Foreign Application Priority Data

Jul. 13, 2020 (KR) ........................ 10-2020-0086315

(51) Int. Cl.
*H04N 5/232* (2006.01)

(52) U.S. Cl.
CPC ..... *H04N 5/23225* (2013.01); *H04N 5/23248* (2013.01)

(58) Field of Classification Search
CPC .. H04N 5/23225; H04N 5/23248; G03B 7/00; G03B 7/04; G03B 7/085; G03B 7/095
USPC .................................................. 348/207.99
See application file for complete search history.

(56) References Cited

U.S. PATENT DOCUMENTS

| 5,264,896 | A | * | 11/1993 | Lee | ........................ | G03B 7/087 |
|---|---|---|---|---|---|---|
| | | | | | | 396/235 |
| 5,822,629 | A | * | 10/1998 | O'Brien | .................. | G03B 9/16 |
| | | | | | | 396/235 |
| 6,922,030 | B2 | * | 7/2005 | Chou | ....................... | G03B 9/14 |
| | | | | | | 318/400.22 |
| 2010/0166416 | A1 | * | 7/2010 | Okita | ....................... | G03B 9/02 |
| | | | | | | 396/449 |
| 2016/0105595 | A1 | * | 4/2016 | Huang | .................. | H04N 5/238 |
| | | | | | | 348/363 |

FOREIGN PATENT DOCUMENTS

| KR | 10-1999-020315 A | 3/1999 |
|---|---|---|
| KR | 10-2009-0048841 A | 5/2009 |

* cited by examiner

*Primary Examiner* — Lin Ye
*Assistant Examiner* — Chan T Nguyen
(74) *Attorney, Agent, or Firm* — NSIP Law (57) ABSTRACT

A controller of a camera iris is provided. The controller includes a signal processing circuit that generates a detected position value corresponding to a current position of the iris, based on first and second sensing signals respectively received from first and second position sensors that detects an aperture position of the iris; a control circuit, that sets a section between the first aperture position and the second aperture position to a plurality of control sections, and if a command to change the aperture of the iris is made, performing a corresponding control operation for each of the plurality of control sections to control a movement operation of the iris, based on the detected position value; and a driving circuit that generates a driving current, and provide the generates driving current to a coil to drive the iris under control of the controller.

29 Claims, 7 Drawing Sheets

CONTROL CIRCUIT AND CAMERA IRIS DRIVING DEVICE

CROSS-REFERENCE TO RELATED APPLICATION(S)

This application claims the benefit under 35 USC § 119(a) of Korean Patent Application No. 10-2020-0086315, filed on Jul. 13, 2020, in the Korean Intellectual Property Office, the entire disclosure of which is incorporated herein by reference for all purposes.

BACKGROUND

1. Field

The following description relates to a control circuit and a camera iris driving device.

2. Description of Related Art

Typically, a camera that is implemented in a mobile device, or the like, may utilize an iris to adjust illumination. By using the iris, an amount of light incident in the camera can be adjusted.

Since the iris of a battlefield camera that is implemented in an autonomous vehicle should maintain a current iris position stably due to strong impacts to the vehicle and external forces generated during normal driving of the vehicle, in the camera iris assembly of the mobile device, strong magnets may be disposed in each of the wide aperture position and the narrow aperture position of the iris to maintain the position of the iris.

However, in the iris assembly that uses such a strong magnet, when the iris is changed from a wide aperture position to a narrow aperture position, or when the iris is changed from a narrow aperture position to a wide aperture position, there is a problem in that the objects of the iris may physically impact one another due to the attractive force between the yoke and the magnet.

Accordingly, the reliability of the lifespan of the iris, and extended shaking of the iris after the occurrence of an impact when changing an aperture of the iris, may occur, which may result in the deterioration of image signal quality.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a controller of a camera iris includes a signal processing circuit, configured to generate a detected position value corresponding to a current position of the iris, based on a first sensing signal and a second sensing signal respectively received from a first position sensor and a second position sensor that are configured to detect an aperture position of the iris; a control circuit, configured to set a section between a first aperture position and a second aperture position to a plurality of control sections, and upon receiving a command to change the aperture position of the iris, performing a corresponding control operation for each of the plurality of control sections to control a movement operation of the iris, based on the detected position value; and a driving circuit, configured to generate a driving current, and provide the generated driving current to a coil that is configured to drive the iris under control of the controller.

The controller may include a soft landing controller, configured to detect a corresponding control section corresponding to a current position of the iris among the plurality of control sections, based on the detected position value, and perform a corresponding control operation corresponding to the detected control section; a proportional-integral-derivative (PID) controller, configured to operate in a first control section and a second control section among the plurality of control sections based on a first control operation of the soft landing controller, and perform a closed-loop PID control operation such that the detected position value follows a target value, and control a generation of a forward driving current or a generation of a reverse driving current in the corresponding control section; an open-loop controller, configured to operate in a third control section among the plurality of control sections based on a second control operation of the soft landing controller, and perform an open-loop control, and control the generation of the forward driving current; and a selector, configured to select one control code of control codes input from each of the PID controller and the open-loop controller based on a selection control of the soft landing controller, and output the selected control code to the driving circuit.

When the detected position value is lower than a first threshold value, the soft landing controller may be configured to determine the detected position value to be the first control section, and may be configured to control generation of the forward driving current through the PID controller such that the detected position value follows a maximum target value.

When the detected position value is higher than a first threshold value, and there is no history of the detected position value exceeding a second threshold value, the soft landing controller may be configured to determine the detected position value to be the second control section, and may be configured to control generation of the reverse driving current through the PID controller such that the detected position value follows a minimum target value.

When the detected position value is higher than a second threshold value, or the detected position value is lower than the second threshold value, and there is a history of the detected position value exceeding the second threshold value, the soft landing controller may be configured to determine the detected position value to be the third control section, and control generation of the forward driving current through the open-loop controller that performs the open-loop control.

The PID controller may be configured to operate in the first control section, and control generation of the first driving current in the forward direction with respect to a forward moving direction for a blade, to generate a moving magnetic force, greater than a stationary magnetic force in a starting position, for the blade of the iris.

The PID controller may be configured to operate in the second control section, and control generation of a second driving current in a reverse direction with respect to the forward moving direction of the blade to decelerate a moving speed toward an arrival position, for the blade of the iris.

The open-loop controller may be configured to operate in the third control section, and control generation of a third driving current in a forward direction with respect to the forward moving direction of the blade to be seated in the arrival position, for the blade of the iris.

When operating in the third control section, when not moved in a backward moving direction for a blade of the iris, the open-loop controller may be configured to control generation of a third driving current in a forward direction, wherein the third driving current is lower than a reference current with respect to the forward moving direction of the blade, and when operating in the third control section, when moved in a backward moving direction for a blade of the iris, the open-loop controller may be configured to control generation of the third driving current in a forward direction, wherein the third driving current is higher than a reference current with respect to the forward moving direction of the blade.

The signal processing circuit is configured to use the first sensing signal and the second sensing signal to obtain the detected position value according to the following equation: SP=(SH1+SH2)/(SH1−SH2), where SH1 is the first sensing signal, SH2 is the second sensing signal, and SP is the detected position value.

The driving circuit may include a current setting register which is independently set, respectively, for each of changes from a wide aperture to a narrow aperture, and from a narrow aperture to a wide aperture, to generate different driving currents for each of the plurality of control sections, under control of the control circuit.

A control operation of a first of the plurality of control sections may be independent of a control operation of a second of the plurality of control sections.

In a general aspect, a driving device of a camera iris includes a first position sensor, configured to detect a first sensing signal based on a first iris position, when the iris is moved between a first aperture position and a second aperture position; a second position sensor, configured to detect a second sensing signal based on a second iris position, when the iris is moved between the first aperture position and a second aperture position; a signal processing circuit, configured to generate a detected position value corresponding to a current position of the iris, based on the first sensing signal and the second sensing signal; a control circuit, configured to set a section between the first aperture position and the second aperture position to a plurality of control sections, and upon receiving a command to change the aperture of the iris, performing a corresponding control operation for each of the plurality of control sections, to control a movement operation of the iris, based on the detected position value; and a driving circuit, configured to generate a driving current, and provide the generated driving current to a coil that is configured to drive the iris under control of the controller.

The control circuit may include a soft landing controller, configured to detect a corresponding control section corresponding to a current position of the iris among the plurality of control sections, based on the detected position value, and perform a corresponding control operation corresponding to the detected corresponding control section; a proportional-integral-derivative (PID) controller, configured to operate in a first control section and a second control section among the plurality of control sections based on a first control operation of the soft landing controller, and perform a closed-loop PID control operation such that the detected position value follows a target value, and control a generation of a driving current in a forward direction or in a reverse direction in the corresponding control section; an open-loop controller, configured to operate in a third control section among the plurality of control sections, based on a second control operation of the soft landing controller, and perform an open-loop control, and control generation of the driving current in the forward direction; and a selector, configured to select one control code of control codes input from each of the PID controller and the open-loop controller based on a selection control of the soft landing controller, and output the selected control code to the driving circuit.

When the detected position value is lower than a first threshold value, the soft landing controller may be configured to determine the detected position value to be the first control section, and may be configured to control generation of the driving current in the forward direction through the PID controller such that the detected position value follows a maximum target value.

When the detected position value is higher than a first threshold value and there is no history of the detected position value exceeding a second threshold value, the soft landing controller may be configured to determine the detected position value to be the second control section, and may be configured to control generation of the driving current in the reverse direction through the PID controller such that the detected position value follows a minimum target value.

When the detected position value is higher than a second threshold value, or when the detected position value is lower than the second threshold value, and there is a history of the detected position value exceeding the second threshold value, the soft landing controller may be configured to determine the detected position value to be the third control section, and control generation of the driving current in the forward direction through the open-loop controller that performs the open-loop control.

The PID controller may be configured to operate in the first control section, and control generation of the first driving current in the forward direction with respect to the forward moving direction of the blade, to generate a moving magnetic force, greater than a stationary magnetic force at the starting position, for the blade of the iris.

The PID controller may be configured to operate in the second control section, and control generation of a second driving current in a reverse direction with respect to the forward moving direction of the blade, to decelerate a moving speed toward an arrival position, for the blade of the iris.

The open-loop controller may be configured to operate in the third control section, and control generation of a third driving current in a forward direction with respect to the forward moving direction of the blade to be seated at an arrival position, for the blade of the iris.

When operating in the third control section, when not moved in a backward moving direction for the blade of the iris, the open-loop controller may be configured to control generation of a third driving current in a forward moving direction, wherein the third driving current is lower than a reference current with respect to the forward moving direction of the blade, for the blade of the iris, and when operating in the third control section, when moved in a backward moving direction for the blade of the iris, the open-loop controller may be configured to control the generation of the third driving current in a forward direction, wherein the third driving current is higher than a reference current with respect the forward moving direction of the blade, for the blade of the iris.

The signal processing circuit may be configured to use the first sensing signal and the second sensing signal to obtain the detected position value according to the following equation: SP=(SH1+SH2)/(SH1−SH2), where SH1 is the first sensing signal, SH2 is the second sensing signal, and SP is the detected position value.

The driving circuit may include a current setting resistor which is independently set, respectively, for each of changes from a wide aperture to a narrow aperture, and from a narrow aperture to a wide aperture, to generate different driving currents for each of the plurality of control sections, under control of the control circuit.

A control operation of a first of the plurality of control sections may be independent of a control operation of a second of the plurality of control sections.

The first aperture position may be a wide aperture position, and the second aperture position may be a narrow aperture position.

In a general aspect, an electronic device includes a camera module including a camera iris control system; wherein the camera iris control system comprises position sensors, configured to detect a first iris aperture position and generate a first sensing signal, and detect a second iris aperture position and generate a second sensing signal; a signal processing circuit, configured to detect a current iris position based on the first sensing signal and the second sensing signal; a control circuit, configured to set a plurality of control sections between the first iris aperture position and the second iris aperture position; and a driving circuit, configured to move the first aperture position and the second iris aperture position separately to one of the plurality of control sections based on a control signal from the control circuit.

The first iris aperture position may be a wide aperture position, and the second iris aperture position is a narrow iris aperture position.

A moving direction of the iris may be changed based on a direction of a driving current that is generated by the driving circuit.

The plurality of sections may include a first control section, a second control section, and a third control section, and wherein the first control section is determined based on a first threshold value, and the second control section and the third control section are determined based on a second threshold value.

Other features and aspects will be apparent from the following detailed description, the drawings, and the claims.

BRIEF DESCRIPTION OF DRAWINGS

FIG. 4A illustrates an example driving current, and an upper view of FIG. 4B illustrates a disposition of a magnet, a yoke, a moving member, and a protrusion pillar, and a lower view of FIG. 4B illustrates a disposition of a coil, and first and second hall sensors.

FIG. 100 is a graph illustrating a detection position for each section when a first threshold value is high.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Hereinafter, examples will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

Figure 1:
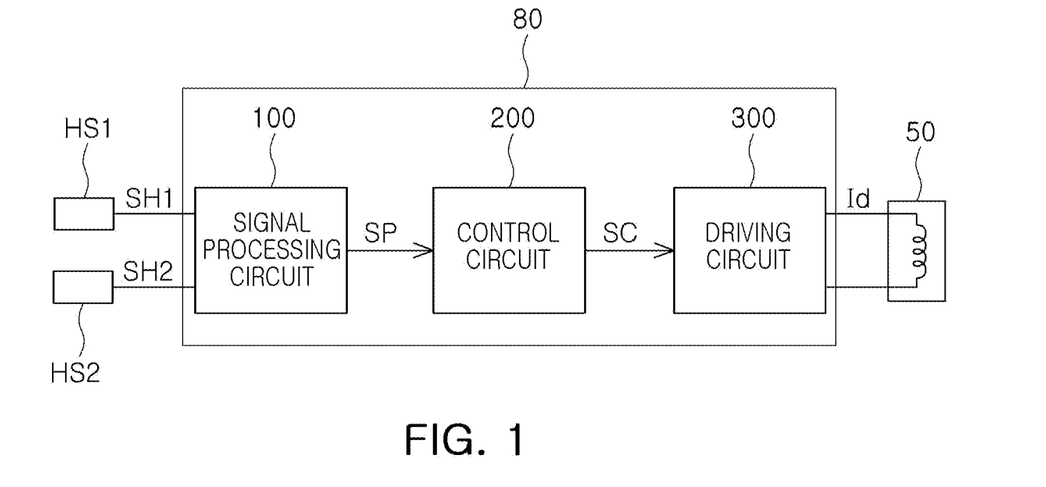
FIG. 1 illustrates an example controller of a camera iris, in accordance with one or more embodiments.

FIG. 1 illustrates an example of a control circuit of a camera iris, in accordance with one or more embodiments.

Referring to FIG. 1, a controller 80 of a camera iris, in accordance with one or more embodiments, may include a signal processing circuit 100, a control circuit 200, and a driving circuit 300.

Figure 2:
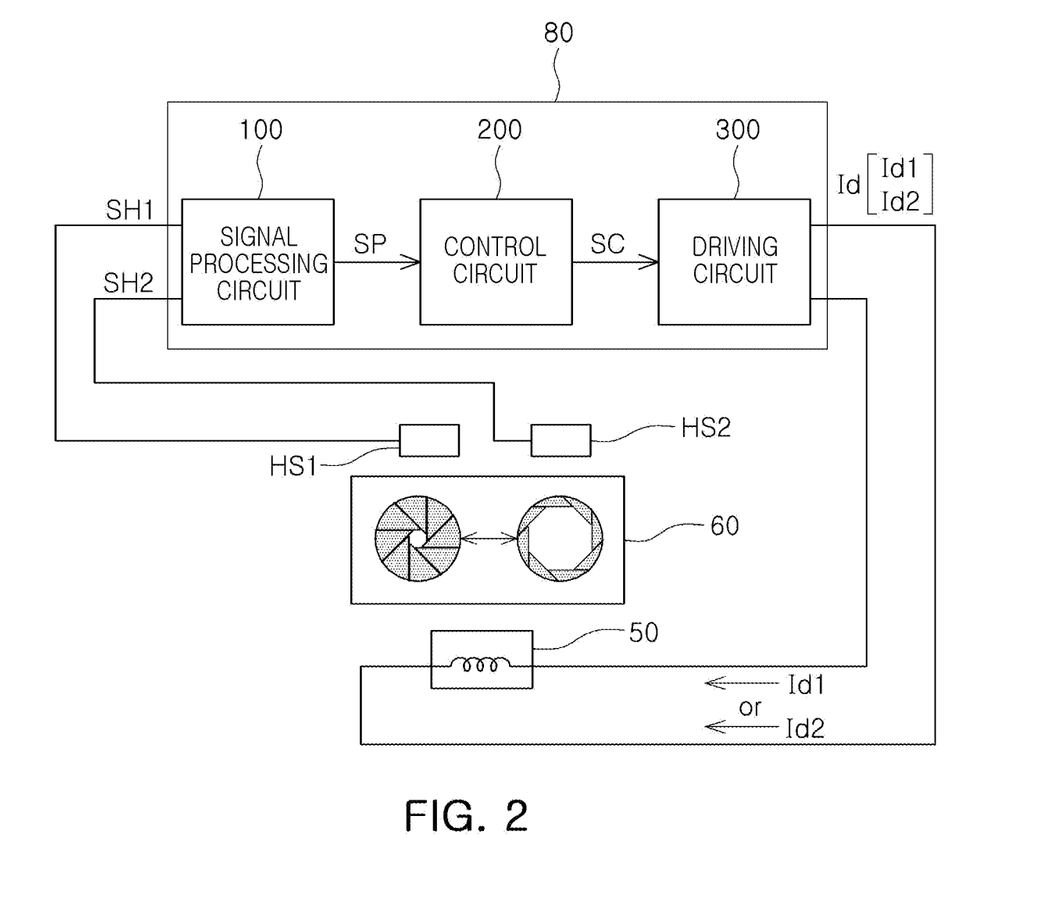
FIG. 2 illustrates an example driving device for a camera iris, in accordance with one or more embodiments.

The signal processing circuit 100 may generate a detected position value SP corresponding to a current position of the iris 60 (FIG. 2), based on first and second sensing signals SH1 and SH2 output from respective first and second position sensors HS1 and HS2 that detect an aperture position of the iris 60 (FIG. 2). Although first and second position sensors are disclosed, this is only an example, and one or more position sensors may be implemented.

In an example, the control circuit 200 may set an entire section between the first aperture position ST1 (e.g., a wide aperture position) and a second aperture position ST2 (e.g., a narrow aperture position) as a plurality of control sections, and if there is a command to change an aperture of the iris 60, based on the detected position value SP, a lower control signal SC for the corresponding control operation, set independently of each other for each of the plurality of control sections, may be output to the driving circuit 300 to change the aperture of the iris 60.

The driving circuit 300 may generate a driving current Id that is transmitted to the coil 50 driving the iris 60 according to the control of the control circuit 200.

FIG. 2 illustrates an example of a driving device of a camera iris, in accordance with one or more embodiments.

Referring to FIG. 2, a driving device of a camera iris according to an example, may include a first position sensor HS1, a second position sensor HS2, a controller 80, which may include a signal processing circuit 100, a control circuit 200, and a driving circuit 300.

The first position sensor HS1 may detect a first sensing signal SH1 according to first position detection for the iris 60 that is moved between a first aperture position ST1 (e.g., a wide aperture position) and a second aperture position ST2 (e.g., a narrow aperture position).

The second position sensor HS2 may detect a second sensing signal SH2 according to second position detection for the iris 60. In an example, each of the first position sensor HS1 and the second position sensor HS2 may be, as a non-limiting example, a Hall sensor (or a hall effect sensor).

The signal processing circuit 100 may generate a detected position value SP corresponding to a current position of the iris 60 (FIG. 2), based on the first sensing signal SH1 and the second sensing signal SH2.

The control circuit 200 may set an entire section between the first aperture position ST1 (e.g., a wide aperture position) and the second aperture position ST2 (e.g., a narrow aperture position) to a plurality of control sections, and when there is a command to change the iris 60, a control signal SC to perform a corresponding control set independently of each other to change the aperture of the iris 60 may be output to a driving circuit 300, based on the detected position value SP.

The driving circuit 300 may generate a driving current Id to be provided to the coil 50 that drives the iris 60 under control of the control circuit 200. In an example, when the driving current Id refers to a driving current in a first direction as a first driving current Id1, a driving current in an opposite direction thereof may be referred to as a second driving current Id2. In a non-limiting example, the first driving current Id1 may be provided to change the aperture position from the second aperture position to the first aperture position, and the second driving current Id2 may be provided to change the aperture position from the first aperture position to the second aperture position, or vice versa.

A moving direction of the iris 60 may be changed according to the direction of the driving current Id flowing through the coil 50. In an example, when the driving current is in the first direction (e.g., Id1), the iris may be moved from the wide aperture position ST1 to the narrow aperture position ST2, and alternately, for the driving current (e.g., Id2) in the second direction opposite to the first direction, the iris 60 may be moved from the narrow aperture position ST2 to the wide aperture position ST1.

Figure 3:
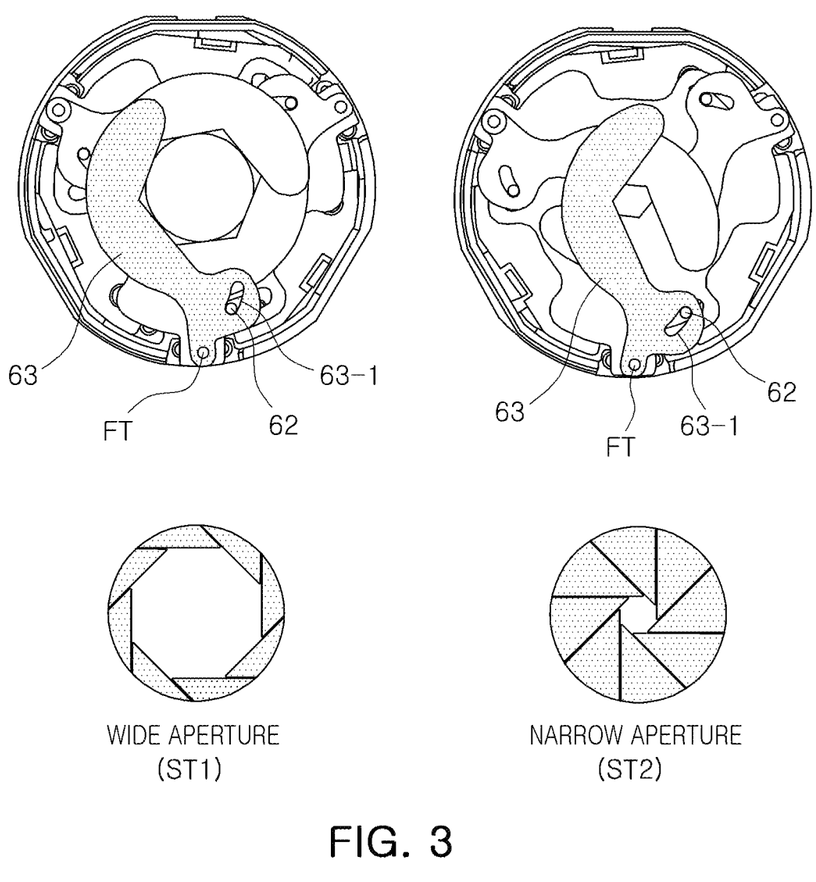
FIG. 3 is an illustrative view of the wide aperture position and the narrow aperture position of the iris.

FIG. 3 is an illustrative view of a wide aperture position and a narrow aperture position of an iris, in accordance with one or more embodiments.

Referring to FIGS. 2 and 3, when a driving current flows through a coil 50 (FIG. 2), a magnet 64 (FIG. 4B), a moving member 61 (FIG. 4B), and a protrusion pillar 62 (FIG. 4B) may be moved, and a plurality of blades 63 operating in synchronization with each other may be moved, and accordingly, the iris 60 may be moved from the first aperture position (e.g., the wide aperture position) to the second aperture position (e.g., the narrow aperture position) or moved from the second aperture position (e.g., the narrow aperture position) to the first aperture position (e.g., the wide aperture position).

In FIG. 3, FT is a fixed rotational axis that becomes a central axis of a positional movement of the blade 63, and 63-1 may accommodate a protrusion pillar 62, and may perform a function of changing the aperture position of the blade 63 according to the position movement of the protrusion pillar 62 disposed on the moving member, moved according to the movement of the magnet according to the position movement of the magnet. This will be described in more detail in FIGS. 4 and 5.

Figure 4A:
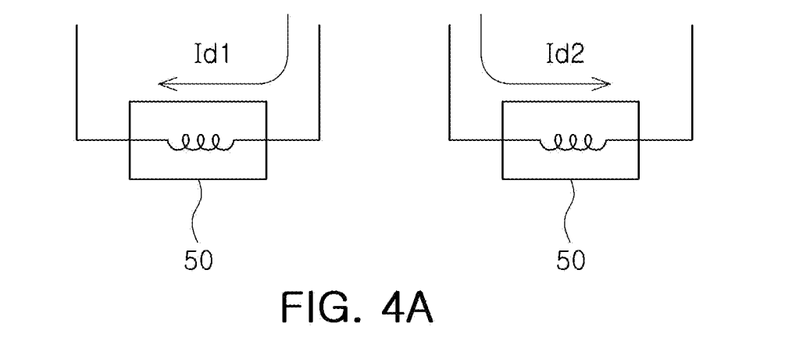
Figure 4B:
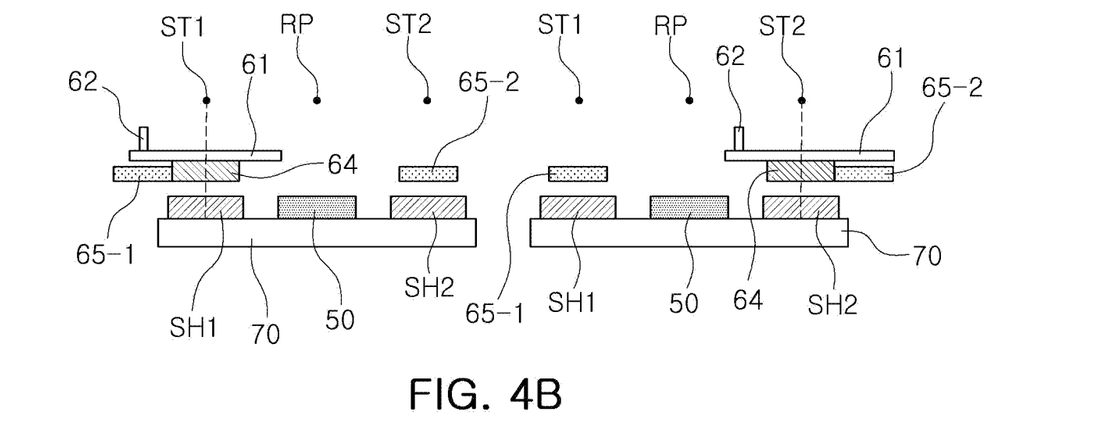

FIG. 4A illustrates a view of a driving current, an upper view of FIG. 4B is an example of a disposition of a magnet, a yoke, a moving member, and a protrusion pillar, and a lower view of FIG. 4B is an example of a disposition of a coil, and first and second hall sensors.

Referring to FIG. 4A, a driving current may flow to the coil 50 in both directions, and if Id1 is a first driving current, Id2 may be a second driving current. In an example, the iris 60 may be moved from the wide aperture position ST1 to the narrow aperture position ST2 by the first driving current Id1, and alternatively, the iris 60 may be moved from the narrow aperture position ST2 to the wide aperture position ST1 by the second driving current Id2.

Referring to an upper side view of FIG. 4B, a magnet 64 may be moved to the first aperture position ST1 by the first driving current I1, and in this example, the magnet 64 may be moved together with the moving member 61 fixed to the magnet 64, and the protrusion pillar 62 provided on the moving member 61 may be moved. When the protrusion pillar 62 is moved, the blade 63 having the hole 63-1 into which the protrusion pillar 62 is inserted may be moved to the first aperture position ST1.

On the contrary, the magnet 64 may be moved to the second aperture position ST2 by the second driving current I2, and in this example, the magnet 64 and the moving member 61 fixed to the magnet 64 may be moved together, and a protrusion pillar 62 provided on the moving member 61 may be moved. When the protrusion pillar 62 is moved, the blade 63 having a hole 63-1 into which the protrusion pillar 62 is inserted may be moved to the second aperture position ST2.

In an example, the first aperture position ST1 may be a wide aperture position, the second aperture position ST2 may be a narrow aperture position, or vice versa.

Additionally, referring to a lower side view of FIG. 4B, the coil 50 may be mounted on the substrate 70 such as the first and hall sensors HS1 and HS2, and in an example, the coil 50 may be disposed between the first and second hall sensors HS1 and HS2.

Figure 5:
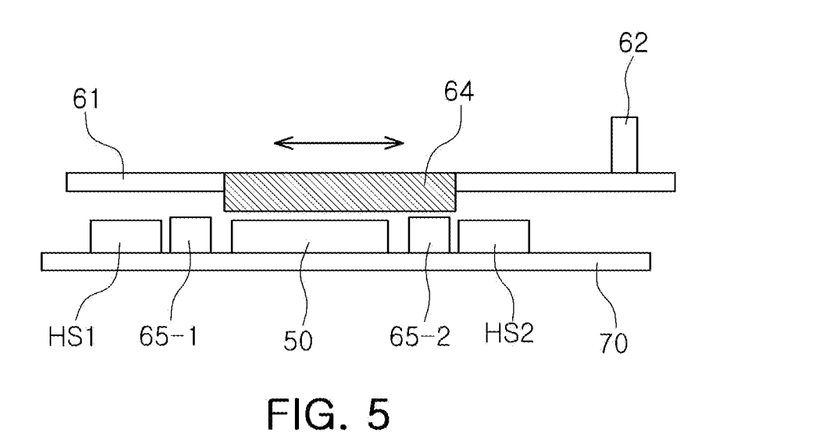
FIG. 5 illustrates example first and second hall sensors, first and second yokes, a driving coil, a magnet, a blade, and a protrusion pillar.

FIG. 5 is an example view of a disposition of the first and second hall sensors, first and second yokes, a driving coil, a magnet, a blade, and a protrusion pillar, in accordance with one or more embodiments.

A structure illustrated in FIG. 4B may be illustrated as in FIG. 5. Referring to FIG. 5, a driving coil 50 may be mounted on a substrate 70, first and second yokes 65-1 and 65-2 may be disposed on both sides of the driving coil 50, and first and second hall sensors HS1 and HS2 may be disposed on both outer sides of the first and second yokes 65-1 and 65-2.

A magnet 64 may be disposed at the iris 60 spaced apart from the drive coil 50 by a predetermined distance, and the iris 60 may include a moving member 61 fixed to the magnet 64 and a protrusion pillar 62 disposed in the moving member 61.

Figure 6:
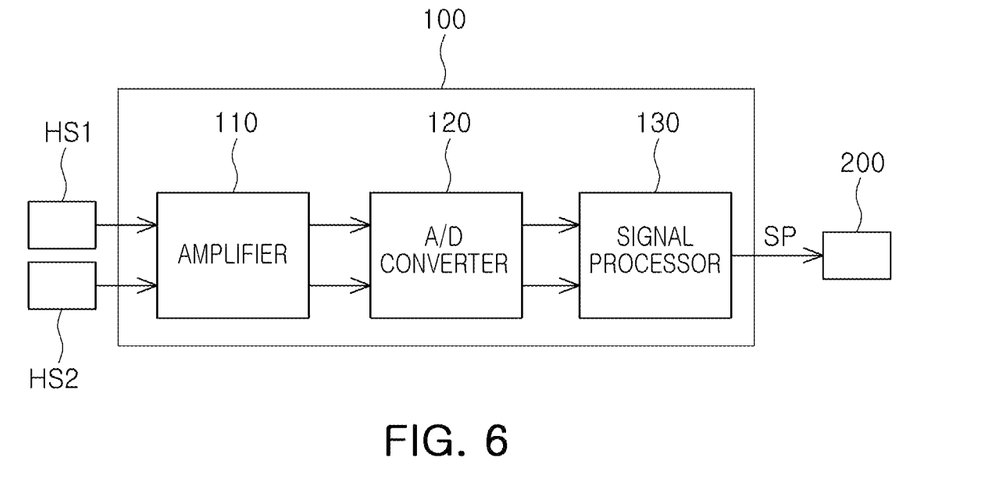
FIG. 6 illustrates an example signal processing circuit.

FIG. 6 illustrates an example signal processing circuit, in accordance with one or more embodiments.

Referring to FIG. 6, the example signal processing circuit 100 may include an amplifier 110, an A/D converter 120, and a signal processor 130.

The amplifier 110 may amplify and output the first sensing signal SH1 and the second sensing signal SH2 to the A/D converter 120. In an example, the first sensing signal SH1 and the second sensing signal SH2, output from the respective first and second hall sensors HS1 and SH2, may be too small in magnitude, so that it may be necessary to amplify the magnitude of the signals to be processed at a later stage.

The A/D converter 120 may convert the first sensing signal SH1 and the second sensing signal SH2 in analog form input from the amplifier 110 into a signal in digital form.

The signal processor 130 may use the first sensing signal SH1 and the second sensing signal SH2 in a digital form input from the A/D converter 120 to obtain the detected position value SP according to Equation 1 below.

$$SP=(SH1+SH2)/(SH1-SH2) \quad [\text{Equation 1}]$$

Figure 7:
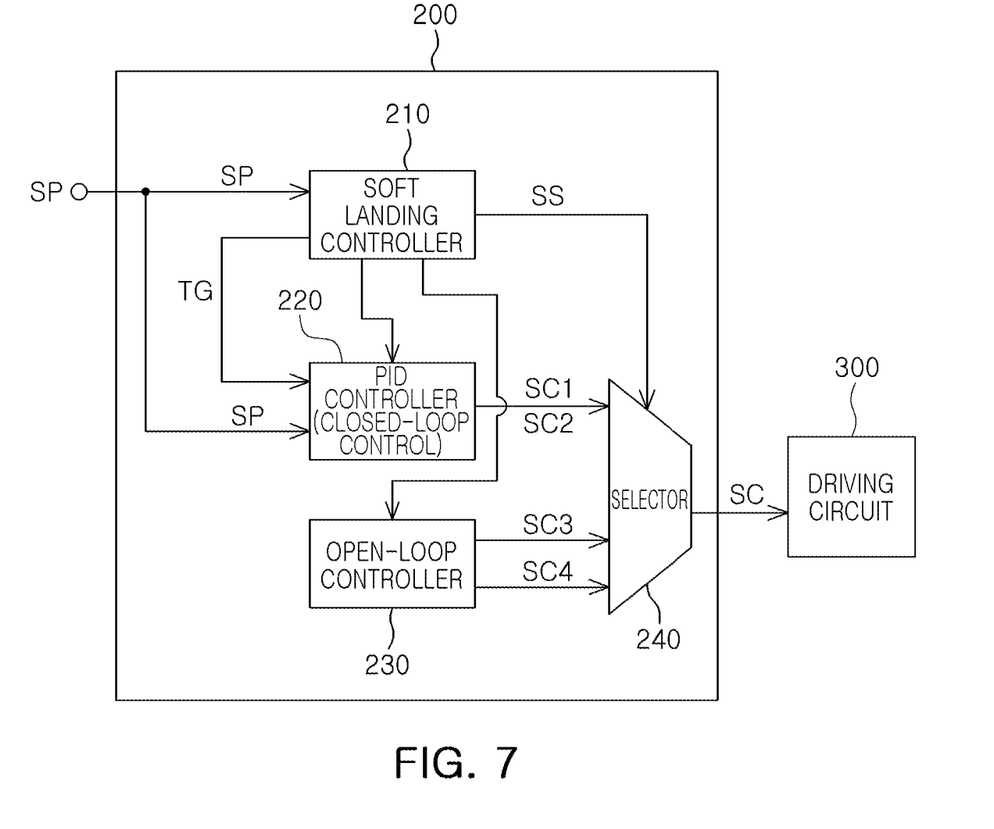
FIG. 7 illustrates an example control circuit.

FIG. 7 illustrates an example control circuit.

Referring to FIG. 7, in an example, the control circuit 200 may include a soft landing controller 210, a proportional-integral-derivative (PID) controller 220, an open-loop controller 230, and a selector 240.

The soft landing controller 210 may detect a corresponding control section corresponding to a current position of the iris 60 among the plurality of control sections, based on the detected position value SP, and may perform the corresponding control corresponding to the control section. In an example, the plurality of control sections may include first, second, and third control sections CP1, CP2, and CP3. The plurality of control sections are not limited to the above-described example.

The PID controller 220 may operate in the first and second control sections CP1 and CP2 among the plurality of control sections under control of the soft landing controller 210, and perform a closed-loop PID control such that the detected position value SP follows a target value, and thus it may be possible to control generation of a driving current in a forward direction and generation of a driving current in a reverse direction in the corresponding control section.

The open-loop controller 230 may operate in a third control section CP3 of the plurality of control sections under control of the soft landing controller 210 to perform an open-loop control to control generation of a forward driving current.

The selector 240 may select one control code of control codes SC1, SC2, SC3, and SC4 input from each of the PID controller 220 and the open-loop controller 230 according to the selection control SS of the soft landing controller 210, and output the selected control code to the driving circuit 300.

Figure 8:
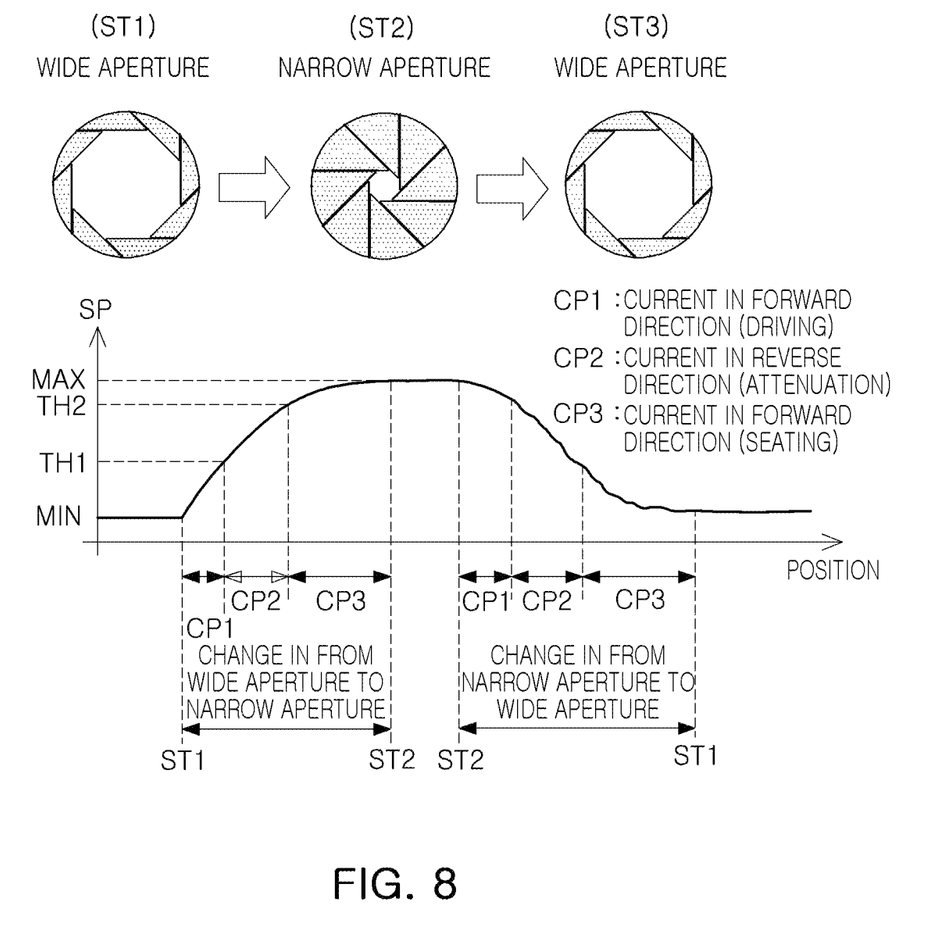
FIG. 8 illustrates an example of a plurality of control sections.

FIG. 8 illustrates an example of a plurality of control sections.

Referring to FIGS. 7 and 8, the control circuit 200 may set an entire region between the first aperture position ST1 (e.g., a wide aperture position) and the second aperture position ST2 (e.g., a narrow aperture position) to a plurality of control sections. In the graph illustrated in FIG. 8, a vertical axis may be a detected position value SP, and a horizontal axis may be a position. Here, the detected position value SP may be any value between a maximum value MAX and a minimum value MIN.

In an example, the plurality of control sections may be divided into a first control section CP1, a second control section CP2, and a third control section CP3, between the first aperture position ST1 (e.g., a wide aperture position) and the second aperture position ST2 (e.g., a narrow aperture position).

In an example, the first control section CP1 and the second control section CP2 may be determined based on a first threshold value TH1, the second control section CP2 and the third control section CP3 may be determined based on a second threshold value TH2.

In an example, the first control section CP1 may be a section to control strong movement from a starting position (e.g., a first aperture position) to an arrival position (e.g., a second aperture position) in terms of the position, and may be a section to rapidly control the movement from the minimum value (MIN) to the maximum value (MAX) in terms of the detected position value SP.

The second control section CP2 may be a section to control movement between the starting position (e.g., the first aperture position) and the arrival position (e.g., the second aperture position) in terms of position, and may be a section to control attenuation of the moving speed toward the maximum value between the minimum value MIN and the maximum value MAX in terms of the detected position value SP.

The third control section CP3 may be a section to control soft movement to be seated at the arrival position (e.g., the second aperture position) in terms of position, and is a section for controlling soft movement toward the maximum value (MAX) in terms of the detected position value SP.

Figure 9:
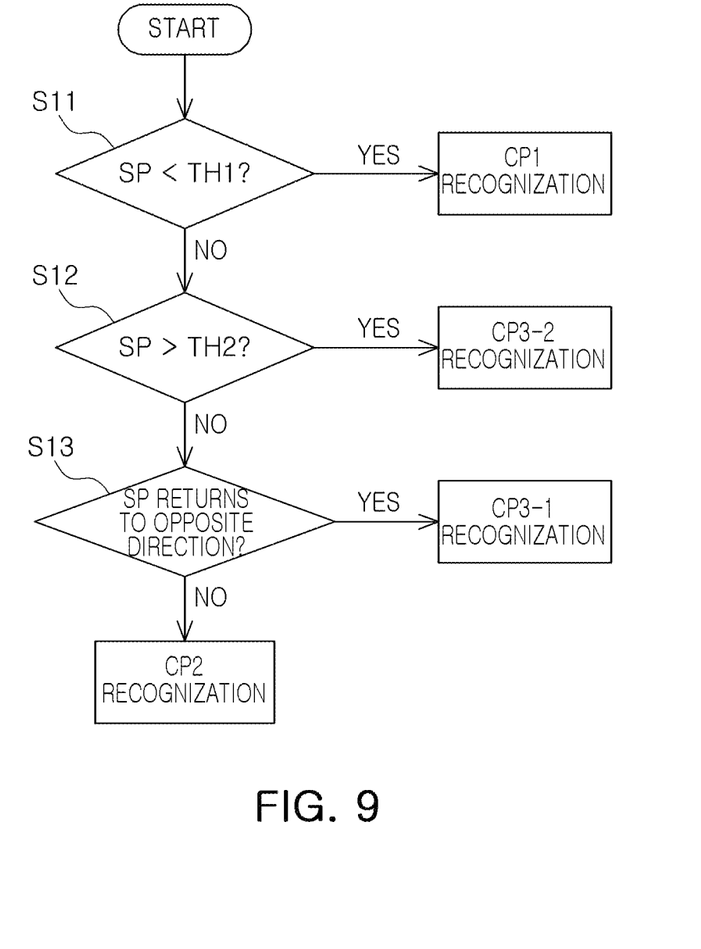
FIG. 9 illustrates a determination example for a control section.

FIG. 9 is a flowchart illustrating an example position determination for a control section, in accordance with one or more embodiments.

Referring to FIGS. 7, 8, and 9, when the detected position value SP is lower than a first threshold value TH1, the soft landing controller 210 may determine the detected position value SP to be the first control section CP1. In this example, the soft landing controller 210 may control generation of a driving current in a forward direction through the PID controller 220 such that the detected position value SP follows a maximum target value.

In an example, the PID controller 220 may operate in the first control section CP1, and may control generation of a first driving current in a forward direction with respect to the forward moving direction of the blade 63 (e.g., a direction from the starting position to the arrival position) to generate moving magnetic force, greater than the stationary magnetic force of the starting position ST1 or ST2, for the blade 63 of the iris 60.

Additionally, when the detected position value SP is higher than a first threshold value TH1, and there is no history exceeding a second threshold value TH2 (e.g., when there is no history that the detected position value SP is returned in the opposite direction), the soft landing controller 210 may determine the detected position value SP to be the second control section CP2. In this example, the soft landing controller 210 may control generation of a driving current in a reverse direction through the PID controller 220 such that the detected position value SP follows a minimum target value (min target).

In an example, the PID controller 220 may operate in the second control section CP2, and may control generation of a second driving current in a reverse direction with respect to the forward moving direction of the blade 63 (e.g., a direction from the starting position to an arrival position) to decelerate a moving speed toward the arrival position ST2 or ST1 for the blade 63 of the iris 60.

When the detected position value SP is higher than a first threshold value TH1 (e.g., a 3-2 control section CP3-2), and the detected position value SP is lower than a second threshold value TH2, but there is no history exceeding the second threshold value TH2 (e.g., a 3-1 control section CP3-1), the soft landing controller 210 may determine the detected position value SP to be the third control section CP3. In this example, the soft landing controller 210 may control generation of a driving current in a forward direction through the open-loop controller 230 performing open loop control.

In an example, the open-loop controller 230 may operate in the third control section CP3, and may control generation of a third driving current in a forward direction with respect to the forward moving direction of the iris 60 (e.g., a direction from the starting position to the arrival position) to be seated at the arrival position PT1 for the blade 63 of the iris 60.

Additionally, the open-loop controller 230, when operating in the third control section CP3, when not moved in a reverse direction (e.g., a direction opposite to the forward direction) for a blade 63 of the iris 60, it is possible to control generation of a third driving current in a forward direction, lower than a reference current for the forward moving direction of the blade 63 (e.g., a direction from a starting position to an arrival position).

Further, when the open-loop controller 230 is operated in the third control section CP3, and moves in a reverse direction (e.g., a direction opposite to the forward direction) for a blade 63 of the iris 60, the open-loop controller 230 may control generation of a third driving current in a forward direction, higher than a reference current for the forward moving direction of the blade 63 (e.g., from a starting position to an arrival position).

The driving circuit 300 may include a current setting register set independently of each other, respectively, for each of aperture changes from a wide aperture to a narrow aperture (from the first aperture position ST1 to the second aperture position ST2) and from a narrow aperture to a wide aperture (from the second aperture position ST2 to the first aperture position ST1), to generate different driving currents for each of the plurality of control sections, under control of the control circuit 200.

Meanwhile, referring to FIGS. 8 and 9, the first control section CP1, the second control section CP2, and the third control section CP3 will be described as follows.

First, the first control section CP1 may be a section in which the iris 60 starts driving from a first aperture position (e.g., a wide aperture position) among different aperture positions (e.g., a wide aperture position, or a narrow aperture position) to a second aperture position (e.g., a narrow aperture position), and may be a section in which a control target may quickly move to an opposite side by overcoming an attractive force of the magnet at the current position of the iris 60.

In an example, in the first control section CP1, when performing a control operation from a wide aperture position to a narrow aperture position, the target value of PID control may be set to a maximum position value (max) of the opposite iris position (e.g., a narrow aperture position or a wide aperture position). As the forward driving force gradually increases due to the forward large current generated in the first control section CP1, the attractive force of the magnet may be overcome such that the iris moves forward to the opposite side, and in this example, when the detected position value corresponding to the current position for the iris 60 exceeds a first threshold value TH1, the iris may be entered into a second control section CP2.

Next, the second control section CP2 may be a section in which controlling, such that the soft landing is performed by attenuating the moving speed of the iris 60 moving to a target position at a high speed, is a control target. In the second control section CP2, the target value of the PID control may be set to a much lower than the detected position value corresponding to the current position (e.g., a minimum (min)value. In an example, since the iris 60 advances from the wide aperture position to the narrow aperture position, an error value may gradually increase, so a current in a reverse direction increases in the driving coil, and force in a reverse direction generated thereby, decreases the moving speed of the iris 60 rapidly proceeding in the forward direction, due to the combined force of inertial force proceeding in the forward direction and an attractive force of the magnet generated in the narrow aperture position.

Through this process, when speed is decreased while increasing force in the reverse direction with respect to the forward direction in the second control section CP2, when the position of the iris 60 reaches the second threshold value TH2 from the narrow aperture position, a final target narrow aperture position (a maximum position value in FIG. 8), the iris 60 enters a third control section CP3.

Here, an example in which the force in the reverse direction is generated to be so high that the position of the iris 60 does not reach the second threshold value TH2 entering the third control section CP3, and then returns to the opposite direction again, may occur. In this example, even if it is detected that the position of the iris 60 stops and then returns to the opposite direction of the forward moving direction, the third control section CP3 may be entered by the iris.

The third control section CP3 may be a seating section whose control target is to minimize physical impacts to soft landing to a final target position (e.g., a narrow aperture position or a wide aperture position), but to also ensure stable seating.

The third control section CP3 is an example of a 3-1 control section CP3-1 and a 3-2 control section CP3-2 according to an entered situation, and may be controlled differently by dividing two examples.

First, in the example of the 3-1 control section CP3-1, it may be sensed that the force in the reverse direction is too large in the second control section CP2 to return to the opposite direction of the forward moving direction, and the iris then enters into the third control section CP3. In the example of the 3-2 control section CP3-2, the force in the reverse direction may not be too large in the second control section CP2, so the position of the iris 60 proceeds in the forward direction and then satisfies the second threshold value TH2 to control the iris to enter the third control section CP3.

In the example of the 3-1 control section (CP3-1), the iris is to return to the direction in which it came, so that a large force in the forward direction is generated as soon as possible to control the iris position to proceed toward the targeted small aperture direction. In the 3-2 control section CP3-2, as the speed decreases, the iris may proceed in the forward direction, and may exceed the second threshold value, even if no force is applied, or if only a small force in the forward direction is applied, and thus, it is combined with attractive force of the magnet to be seated in a narrow aperture position, which is a desired final position.

In the 3-2 control section CP3-2, as the speed decreases, the iris may proceed in the forward direction, and may exceed the second threshold value, even if no force is applied or if only a small force in the forward direction is applied, and thus, it is combined with attractive force of the magnet to be seated in a narrow aperture position, which is a desired final position.

Figure 10A:
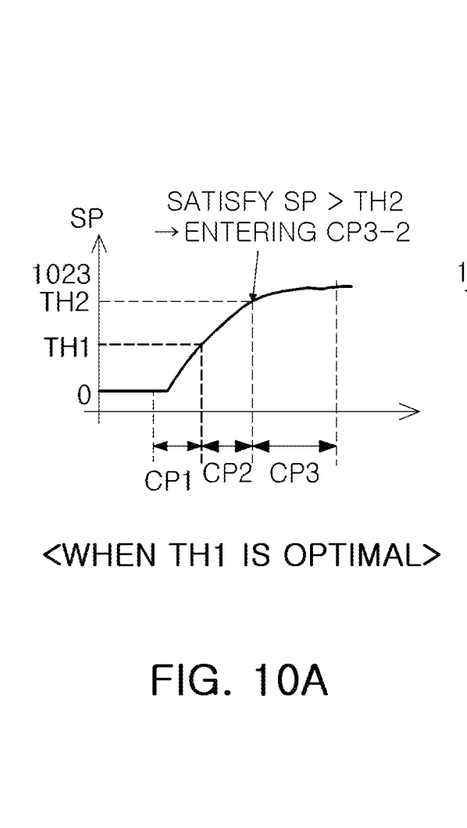
FIG. 10A is a graph illustrating a detection position for each section for an example in which a first threshold value is optimal.
Figure 10B:
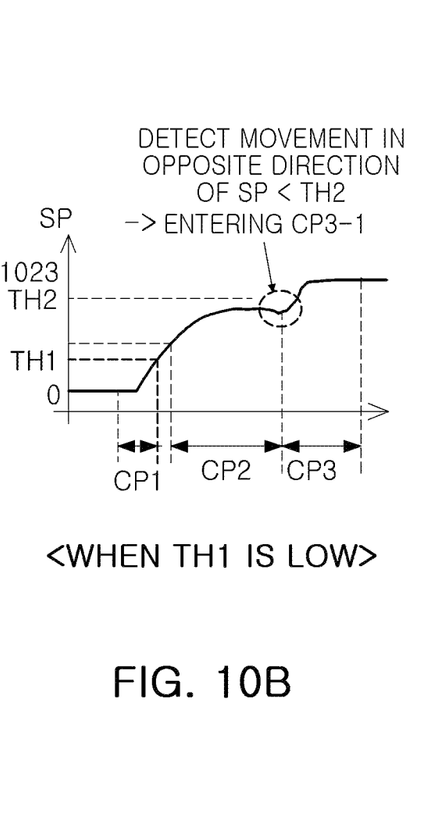
FIG. 10B is a graph illustrating a detection position for each section when a first threshold value is low.
Figure 10C:
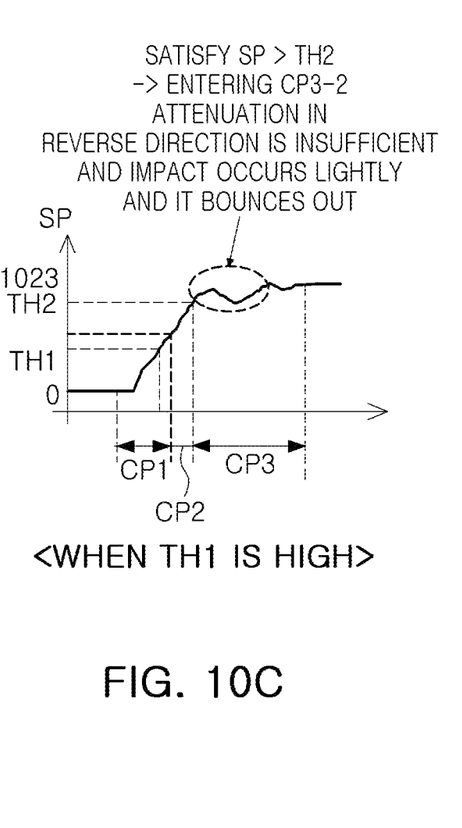

FIG. 10A is a graph illustrating a detection position for each section when a first threshold value is optimal. FIG. 10B is a graph illustrating a detection position for each section when a first threshold value is low, and FIG. 10O is a graph illustrating a detection position for each section when a first threshold value is high.

Referring to FIG. 10A, when a first threshold value TH1 is optimal, it can be seen that the optimal soft landing control is performed, as can be seen by referring to the detection position for each section.

Referring to FIG. 10B, as can be seen by referring to the detection position for each section when the first threshold value is low, it can be seen that there is movement in an opposite direction, so that the optimal soft landing control is not performed.

Referring to FIG. 10O, as can be seen by referring to the detection position for each section when the first threshold value is high, it can be seen that reverse attenuation is insufficient, and thus an impact between a magnet and a yoke is generated lightly in an aperture assembly, and a blade attached to the magnet bounces out of a predetermined position due to the repulsive force against the impact, such that the optimal soft landing control is not performed.

Meanwhile, the control circuit 200 of the vehicle camera system according to an example may be implemented in a computing environment in which a processor (e.g., a central processing unit (CPU), a graphics processor (GPU), a microprocessor, an application specific integrated circuit (ASIC), a field programmable gate array (FPGA)), a memory (a volatile memory (e.g., a RAM), a non-volatile memory (e.g., a ROM and a flash memory), an input device (e.g., a keyboard, a mouse, a pen, a voice input device, a touch input device, an infrared camera, a video input device, or the like), an output device (e.g., a display, a speaker, a printer, or the like), and a communications connection device (e.g., a modem, a network interface card (NIC), an integrated network interface, a wireless frequency transmitter/receiver, an infrared port, a USB connection device, or the like) are interconnected (e.g., peripheral component interconnect (PCI), USB, firmware (IEEE 1394), an optical bus structure, a network, or the like).

The computing environment may be implemented as a personal computer, a server computer, a handheld or laptop device, a mobile device (a mobile phone, a PDA, a media player, or the like), a multiprocessor system, a consumer electronic device, a mini-computer, a mainframe computer, and a distributed computing environment including an above-described random system or device, but an example embodiment thereof is not limited thereto.

As set forth above, according to an example, soft landing may be implemented between a wide aperture position and a narrow aperture position, by dividing between the wide aperture position and the narrow aperture position into a plurality of control sections, and successively performing corresponding controls set independently of each other for each of the plurality of control sections, for performing the soft lading Additionally, it is possible to prevent shaking of the iris due to extending a lifespan and shocks of the iris. In an example, when the soft landing control method according to an example is applied, an effect of extending the lifespan of the iris and the sufficient lifespan reliability of the electric field can be secured. A problem, in which an additional iris shaking occurs for a certain period of time due to a bouncing phenomenon due to an impact when a typical iris is changed, such that an image quality deterioration phenomenon occurs, may be solved.

Additionally, if a threshold is optimally set for each sample (or each product), a soft landing control for each sample can be optimized. In an example, manufacturing dispersion of the physical product is inevitable, and when inspection and calibration is performed using an external inspection equipment, the manufacturing cost increases, but when an optimal parameter for soft landing by the present disclosure is set and applied, it is possible to optimize the soft landing control for each sample while minimizing the increase in manufacturing cost, thereby obtaining an optimal performance.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A controller of a camera iris, the controller comprising:
   a signal processing circuit, configured to generate a detected position value corresponding to a current position of the iris, based on a first sensing signal and a second sensing signal respectively received from a first position sensor and a second position sensor that are configured to detect an aperture position of the iris;
   a control circuit, configured to set a section between a first aperture position and a second aperture position to a plurality of control sections, and upon receiving a command to change the aperture position of the iris, performing a corresponding control operation for each of the plurality of control sections to control a movement operation of the iris, based on the detected position value; and
   a driving circuit, configured to generate a driving current, and provide the generated driving current to a coil that is configured to drive the iris under control of the controller.

2. The controller of claim 1, wherein the controller comprises:
   a soft landing controller, configured to detect a corresponding control section corresponding to a current position of the iris among the plurality of control sections, based on the detected position value, and perform a corresponding control operation corresponding to the detected control section;
   a proportional-integral-derivative (PID) controller, configured to operate in a first control section and a second control section among the plurality of control sections based on a first control operation of the soft landing controller, and perform a closed-loop PID control operation such that the detected position value follows a target value, and control a generation of a forward driving current or a generation of a reverse driving current in the corresponding control section;
   an open-loop controller, configured to operate in a third control section among the plurality of control sections based on a second control operation of the soft landing controller, and perform an open-loop control, and control the generation of the forward driving current; and
   a selector, configured to select one control code of control codes input from each of the PID controller and the open-loop controller based on a selection control of the soft landing controller, and output the selected control code to the driving circuit.

3. The controller of claim 2, wherein, when the detected position value is lower than a first threshold value, the soft landing controller is configured to determine the detected position value to be the first control section, and is configured to control generation of the forward driving current through the PID controller such that the detected position value follows a maximum target value.

4. The controller of claim 2, wherein, when the detected position value is higher than a first threshold value, and there is no history of the detected position value exceeding a second threshold value, the soft landing controller is configured to determine the detected position value to be the second control section, and is configured to control generation of the reverse driving current through the PID controller such that the detected position value follows a minimum target value.

5. The controller of claim 2, wherein, when the detected position value is higher than a second threshold value, or the detected position value is lower than the second threshold value, and there is a history of the detected position value exceeding the second threshold value, the soft landing controller is configured to determine the detected position value to be the third control section, and control generation of the forward driving current through the open-loop controller that performs the open-loop control.

6. The controller of claim 3, wherein the PID controller is configured to operate in the first control section, and control generation of the first driving current in the forward direction with respect to a forward moving direction for a blade, to generate a moving magnetic force, greater than a stationary magnetic force in a starting position, for the blade of the iris.

7. The controller of claim 4, wherein the PID controller is configured to operate in the second control section, and control generation of a second driving current in a reverse direction with respect to the forward moving direction of the blade to decelerate a moving speed toward an arrival position, for the blade of the iris.

8. The controller of claim 5, wherein the open-loop controller is configured to operate in the third control section, and control generation of a third driving current in a forward direction with respect to the forward moving direction of the blade to be seated in the arrival position, for the blade of the iris.

9. The controller of claim 8, wherein, when operating in the third control section, when not moved in a backward moving direction for a blade of the iris, the open-loop controller is configured to control generation of a third driving current in a forward direction, wherein the third driving current is lower than a reference current with respect to the forward moving direction of the blade, and when operating in the third control section, when moved in a backward moving direction for a blade of the iris, the open-loop controller is configured to control generation of the third driving current in a forward direction, wherein the third driving current is higher than a reference current with respect to the forward moving direction of the blade.

10. The controller of claim 1, wherein the signal processing circuit is configured to use the first sensing signal and the second sensing signal to obtain the detected position value according to the following equation:

$$SP=(SH1+SH2)/(SH1-SH2),$$

where SH1 is the first sensing signal, SH2 is the second sensing signal, and SP is the detected position value.

11. The controller of claim 1, wherein the driving circuit comprises a current setting register which is independently set, respectively, for each of changes from a wide aperture to a narrow aperture, and from a narrow aperture to a wide aperture, to generate different driving currents for each of the plurality of control sections, under control of the control circuit.

12. The controller of claim 1, wherein a control operation of a first of the plurality of control sections is independent of a control operation of a second of the plurality of control sections.

13. A driving device of a camera iris, the driving device comprising:

a first position sensor, configured to detect a first sensing signal based on a first iris position, when the iris is moved between a first aperture position and a second aperture position;

a second position sensor, configured to detect a second sensing signal based on a second iris position, when the iris is moved between the first aperture position and a second aperture position;

a signal processing circuit, configured to generate a detected position value corresponding to a current position of the iris, based on the first sensing signal and the second sensing signal;

a control circuit, configured to set a section between the first aperture position and the second aperture position to a plurality of control sections, and upon receiving a command to change the aperture of the iris, performing a corresponding control operation for each of the plurality of control sections, to control a movement operation of the iris, based on the detected position value; and a driving circuit, configured to generate a driving current, and provide the generated driving current to a coil that is configured to drive the iris under control of the controller.

14. The driving device of claim 13, wherein the control circuit comprises:

a soft landing controller, configured to detect a corresponding control section corresponding to a current position of the iris among the plurality of control sections, based on the detected position value, and perform a corresponding control operation corresponding to the detected corresponding control section;

a proportional-integral-derivative (PID) controller, configured to operate in a first control section and a second control section among the plurality of control sections based on a first control operation of the soft landing controller, and perform a closed-loop PID control operation such that the detected position value follows a target value, and control a generation of a driving current in a forward direction or in a reverse direction in the corresponding control section;

an open-loop controller, configured to operate in a third control section among the plurality of control sections, based on a second control operation of the soft landing controller, and perform an open-loop control, and control generation of the driving current in the forward direction; and a selector, configured to select one control code of control codes input from each of the PID controller and the open-loop controller based on a selection control of the soft landing controller, and output the selected control code to the driving circuit.

15. The driving device of claim 14, wherein, when the detected position value is lower than a first threshold value, the soft landing controller is configured to determine the detected position value to be the first control section, and is configured to control generation of the driving current in the forward direction through the PID controller such that the detected position value follows a maximum target value.

16. The driving device of claim 14, wherein, when the detected position value is higher than a first threshold value and there is no history of the detected position value exceeding a second threshold value, the soft landing controller is configured to determine the detected position value to be the second control section, and is configured to control generation of the driving current in the reverse direction through the PID controller such that the detected position value follows a minimum target value.

17. The driving device of claim 14, wherein, when the detected position value is higher than a second threshold value, or when the detected position value is lower than the second threshold value, and there is a history of the detected position value exceeding the second threshold value, the soft landing controller is configured to determine the detected position value to be the third control section, and control generation of the driving current in the forward direction through the open-loop controller that performs the open-loop control.

18. The driving device of claim 15, wherein the PID controller is configured to operate in the first control section, and control generation of the first driving current in the forward direction with respect to the forward moving direction of the blade, to generate a moving magnetic force, greater than a stationary magnetic force at the starting position, for the blade of the iris.

19. The driving device of claim 16, wherein the PID controller is configured to operate in the second control section, and control generation of a second driving current in a reverse direction with respect to the forward moving direction of the blade, to decelerate a moving speed toward an arrival position, for the blade of the iris.

20. The driving device of claim 17, wherein the open-loop controller is configured to operate in the third control section, and control generation of a third driving current in a forward direction with respect to the forward moving direction of the blade to be seated at an arrival position, for the blade of the iris.

21. The driving device of claim 20, wherein, when operating in the third control section, when not moved in a backward moving direction for the blade of the iris, the open-loop controller is configured to control generation of a third driving current in a forward moving direction, wherein the third driving current is lower than a reference current with respect to the forward moving direction of the blade, for the blade of the iris, and when operating in the third control section, when moved in a backward moving direction for the blade of the iris, the open-loop controller is configured to control the generation of the third driving current in a forward direction, wherein the third driving current is higher than a reference current with respect the forward moving direction of the blade, for the blade of the iris.

22. The driving device of claim 13, wherein the signal processing circuit is configured to use the first sensing signal and the second sensing signal to obtain the detected position value according to the following equation:

$$SP=(SH1+SH2)/(SH1-SH2),$$

where SH1 is the first sensing signal, SH2 is the second sensing signal, and SP is the detected position value.

23. The driving device of claim 13, wherein the driving circuit comprises a current setting resistor which is independently set, respectively, for each of changes from a wide aperture to a narrow aperture, and from a narrow aperture to a wide aperture, to generate different driving currents for each of the plurality of control sections, under control of the control circuit.

24. The driving device of claim 13, wherein a control operation of a first of the plurality of control sections is independent of a control operation of a second of the plurality of control sections.

25. The driving device of claim 13, wherein the first aperture position is a wide aperture position, and the second aperture position is a narrow aperture position.

26. An electronic device comprising:
a camera module including a camera iris aperture control system;
wherein the camera iris aperture control system comprises:
    position sensors, configured to generate a first sensing signal of a first iris aperture position, and generate a second sensing signal of a second iris aperture position;
    a signal processing circuit, configured to detect a current iris aperture position based on the first sensing signal and the second sensing signal;
    a control circuit, configured to set a plurality of control sections between the first iris aperture position and the second iris aperture position; and
    a driving circuit, configured to move the first aperture position and the second iris aperture position separately to one of the plurality of control sections based on a control signal from the control circuit.

27. The electronic device of claim 26, wherein the first iris aperture position is a wide aperture position, and the second iris aperture position is a narrow iris aperture position.

28. The electronic device of claim 26, wherein a moving direction of the iris aperture is changed based on a direction of a driving current that is generated by the driving circuit.

29. The electronic device of claim 26, wherein the plurality of sections comprises a first control section, a second control section, and a third control section, and
wherein the first control section is determined based on a first threshold value, and the second control section and the third control section are determined based on a second threshold value.

* * * * *